United States Patent [19]

Colombini

[11] 4,279,464
[45] Jul. 21, 1981

[54] INTEGRATED OPTICAL WAVELENGTH DEMULTIPLEXER

[75] Inventor: Ettore Colombini, Ottawa, Canada

[73] Assignee: Northern Telecom Limited, Montreal, Canada

[21] Appl. No.: 104,728

[22] Filed: Dec. 18, 1979

[51] Int. Cl.³ ................................................ G02B 5/14
[52] U.S. Cl. ............................ 350/96.19; 350/96.11; 350/96.12; 350/96.18; 370/1
[58] Field of Search .............. 370/1; 350/96.11, 96.12, 350/96.13, 96.15, 96.16, 96.18, 96.19

[56] References Cited

U.S. PATENT DOCUMENTS

| | | | |
|---|---|---|---|
| 3,614,198 | 10/1971 | Martin et al. | 350/96.18 |
| 3,774,987 | 11/1973 | Boivin | 350/96.18 |
| 3,877,784 | 4/1975 | Lin | 350/96.18 |
| 4,001,577 | 1/1977 | Albanese et al. | 370/1 X |
| 4,085,501 | 4/1978 | Currie | 350/96.11 X |
| 4,111,524 | 9/1978 | Tomlinson | 350/96.19 |
| 4,153,330 | 5/1979 | Tomlinson | 350/96.19 X |
| 4,162,118 | 7/1979 | Conwell | 350/96.13 |
| 4,222,628 | 9/1980 | Rigbini et al. | 350/96.11 |

FOREIGN PATENT DOCUMENTS 7714270   6/1979   Netherlands ........................ 350/96.19

OTHER PUBLICATIONS

Ulrich et al., "Geometrical Optics In Thin Film Light Guides", *Applied Optics*, vol. 10, No. 9, Sep. 1971, pp. 2077-2085.
Tseng et al., "A Thin-Film Prism As a Beam Separator . . . ", *Optics Commun.*, vol. 13, No. 3, Mar. 1975, pp. 342-346.
Boyd et al., "An Integrated Optical Waveguide And Charge-Coupled Device Image Array", *IEEE J.Q.E.*, vol. QE-13, No. 4, Apr. 1977, pp. 282-287.
Yao et al., "Shadow Sputtered Diffraction-Limited Waveguide Luneberg Lenses", *A.P.L.*, vol. 33, No. 4, Aug. 1978, pp. 307-309.
Anderson, "Integrated Optical Spectrum Analyzer: An Imminent 'Chip'", *IEEE Spectrum*, Dec. 1978, pp. 22-29.

*Primary Examiner*—John K. Corbin
*Assistant Examiner*—John D. Lee
*Attorney, Agent, or Firm*—Stuart L. Wilkinson

[57] ABSTRACT

An integrated optical wavelength demultiplexer has deposited on a waveguide layer a pair of Luneburg lenses, the first for collimating light from an optical fiber, the second for focussing light at an array of photodetectors formed under the waveguide layer. Between the lenses is the dispersive element, a thin-film prism of a highly dispersive low-loss material such as arsenic trisulfide. A known integrated optical demultiplexer, which uses a chirped diffraction grating to spatially disperse (rather than angularly disperse) the optical wavelengths, would suffer a greater insertion loss particularly for wavelengths coupled out at a later point in the grating. Demultiplexing with a thin-film prism should also result in the capability to handle a larger number of channels, for a given channel isolation and substrate area.

7 Claims, 2 Drawing Figures

INTEGRATED OPTICAL WAVELENGTH DEMULTIPLEXER

This invention relates to an Intergrated Optical Wavelength Demultiplexer (IOWD) for use in Wavelength Division Multiplexed (WDM) optical communications systems.

WDM systems offer a means of combining a number of information channels onto a single optical fiber by transmitting each via a separate optical wavelength carrier. Specifically, each electrical information channel is used to modulate the amplitude of a semiconductor laser which emits a well defined optical wavelength.

The benefits of such a WDM multiplexing scheme are:
increased information capacity per fiber;
relaxed requirements on other types of multiplexing (i.e. TDM, FDM);
potentially a low cost means of multiplexing;
by employing integrated optics techniques, there is potential for lower cost, rugged construction and small size together with high stability and reliability.

Several types of non-integrated optical demultiplexers are known. One, which uses combinations of beam splitters and wavelength dependent filters, suffers greatly from insertion loss as the number of channels is increased. In another demultiplexer a series of GRIN rods are used. These are transparent rods whose composition varies radially with a consequent parabolic variation in refractive index permitting them to be used as lenses to achieve a periodic beam position change. The rods used in this demultiplexer are chosen to be ¼ pitch in length so that a light beam incident at the center of the rod will exit near its periphery and vice versa. A filtering element, which is normal to the rod axis permits a narrow optical waveband to propagate through the rod to a detector. Other wavelengths are reflected into another, laterally offset, GRIN rod where further filtering occurs and so on. Again, this design suffers from insertion loss; in addition, for a large number of channels, the structure is exceedingly complex.

In a third type of demultiplexer, the light from a fiber is collimated at a first lens directed through a discrete prism where dispersion occurs, then through a second lens which focusses individual wavelengths into the ends of an optical fiber array by means of which light is directed to a detector array. Although this type of demultiplexer accomodates a large number of channels it requires accurate positioning of the output fibers and is bulky. In yet another design input light is collimated at a blazed grating from which wavelengths are directed into appropriately located detectors. Although bulky, this design accomodates a large number of channels. Compactness and rigidity can be achieved by using a GRIN rod in place of a normal collimating lens and applying the grating to a rear face, inclined at the blazed angle, the intervening space filled by an index matching wedge. However, size reduction reduces the number of channels somewhat, and meticulous alignment is required.

R. R. Rice, et al, "Multiwavelength Monolithic Integrated Fiber-Optic Terminal", SPIE, Vol. 176, page 133, 1979 have proposed the fabrication of an integrated optical wavelength demultiplexer using a chirped diffraction grating formed within the waveguide. Typically, chirped gratings are made by diffusion into a waveguide although they can be fabricated on a waveguide surface by conventional lithographic techniques. The dynamic range of this device is claimed to be 20 dB and about 8 channels can be demultiplexed.

The use of a chirped grating can cause appreciable scattering of the various wavelengths, and so lower the overall dynamic range and increase interchannel crosstalk. In an N channel demultiplexer, the Nth channel suffers considerably greater loss than the first channel since the wavelength of the Nth channel must travel a greater distance along the grating before being diffracted out.

The number of channels that such a demultiplexer can handle is therefore limited by:
(a) the physical distance between the channels along the grating must be large enough to minimize crosstalk.
(b) as a result of (a), N is limited to the maximum allowable loss difference between channels (which limits dynamic range).
(c) for large N it is necessary to obtain very high quality gratings and a large substrate area is needed.

According to the present invention there is provided an integrated optical wavelength demultiplexer comprising a substrate, a thin film waveguide deposited on the substrate, input means for introducing light from an optical fiber into the waveguide means within the waveguide for collimating the light at a dispersive element and means within the waveguide for focussing light from the dispersive element onto an array of photodetectors formed within the waveguide, the improvement comprising said dispersive element being a thin-film prism.

An embodiment of the invention will now be described by way of example with reference to the accompanying drawings, in which.

Figure 1:
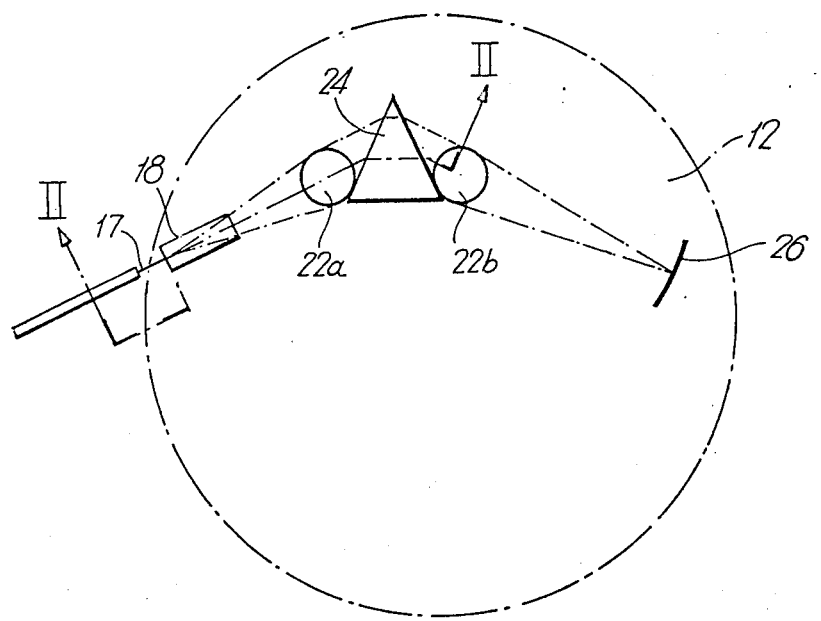
FIG. 1 is a plan view of an integrated optical wavelength demultiplexer according to the invention.
Figure 2:
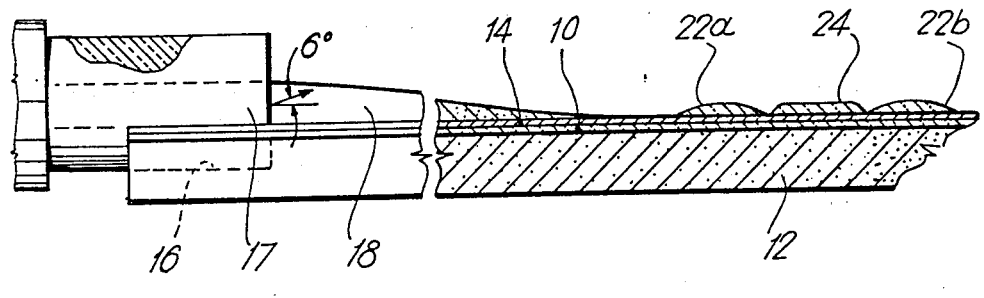
FIG. 2 is a sectional view, not to scale, on the line II—II of FIG. 1.

Referring to the Figures in detail, the upper surface layer 10 of a 3" silicon wafer substrate 12 is thermally oxidized to form $SiO_2$. Over this layer, which has a refractive index of 1.459, is sputter-deposited a uniform thickness waveguide layer of a low-loss, higher index material (such as Corning 7059 which has a refractive index of about 1.57 and loss as low as 0.2 dB/cm). The $SiO_2$ layer optically isolates the waveguide from the Si substrate.

A V-groove 16 is then etched into the silicon substrate to permit accurate positioning of the end of a fiber 20 with core 17 of the fiber 20 located immediately above the substrate surface. An overlay 18 of tantalum pentoxide having a higher refractive index (2.1), than the waveguide is then sputter-deposited on the waveguide with a sufficient thickness to accept the full numerical aperture of the fiber 20. The overlay 18 tapers gradually away from the end of the groove to permit low loss coupling of the light into the waveguide.

Collimating and focussing Luneburg lenses 22 are then sputtered as overlay deposits of a higher index material like tantalum pentoxide with refractive index 2.1.

The Luneburg lenses are sputtered with a specific, well defined profile in order to achieve near diffraction-limited performance and low aberration. The larger the lens, the smaller the spot size at the focus so enabling a greater number of channels to be multiplexed. However, the limitation on the maximum number is then specified by crosstalk requirements, detector spacing and dynamic range. Details of suitable sputtering method may be found in S. K. Yao and D. B. Anderson, "Shadow Sputtering Diffraction-Limited Waveguide Luneburg Lenses", Appl. Phys. Lett, Vol. 33, p. 307, Aug. 1978.

A thin film prism 24 made of a material exhibiting strong chromatic dispersion and low loss such as arsenic trisulfide ($As_2S_3$) having a refractive index of 2.51, is then sputter deposited on the waveguide 14 between the lenses. The profiles of both the lenses and the prism are carefully controlled by using edge-shaped masks during sputter deposition. Profile is important especially in single mode operation, since light couples from the waveguide 14 into the overlay 22 or 24 at a position at which the overlay thickness becomes large enough to sustain the guided mode—and, of course, couples out under the converse conditions. At the input and output ends of the lenses and prismatic deposits 22 and 24 coupling occurs at a specific overlay thickness determined by the refractive index differential between the overlay and the waveguide. It is crucial, therefore, to deposit very smooth and well defined tapers to minimize scattering, but at the same time have a well defined coupling edge.

A detector array, shown schematically as line 26, (FIG. 1), is then formed in a manner known in the art, for example, as an array of silicon photo-diode detectors on 15 μm centres with readout through a two-phase overlapping gate, charge-coupled arrangement (not shown) as described by Boyd and Chen in "An Integrated Optical Waveguide and Charge-Coupled Device Image Array", IEEE Journal of Quantum Electronics, Vol, QE 13, pp. 282–287, April 1977.

In operation, an end part of a 50 μm core fiber 20 is accomodated within the groove 16 so that light from the fiber core 17 enters the tapered $Ta_2O_5$ overlay 18 and gradually couples into the waveguide 14.

For the wavelength range of interest, (800 to 860 nm) the Corning 7059 glass and the $Ta_2O_5$ overlay 18 and Luneburg lenses 22 exhibit little dispersion, as desired. Light, collimated at the first lens 22a strikes the $As_2S_3$ prism 24 and is dispersed. Over the stated wavelength range, $As_2S_3$ exhibits an index change of 0.66%, having a refractive index of 2.5209 at 800 nm and 2.5042 at 860 nm. Other materials, for example, CdSe exhibit a larger index change than $As_2S_3$ but are appreciably more lossy. In order to reduce the beam attenuation, the optical path length through the prism 24 is made as small as possible. The minimum prism size is, however, limited by the size of the optical beam which in turn determines the size of the focussed spot on the detector array.

To minimize reflection losses at the two prism interfaces, the angle of incidence is made equal to the Brewster angle for TM polarization. At each interface, the dispersive nature of the prism 24 results in a wavelength dependent angle of refraction. The resulting angular spread for a given wavelength spread at each interface is:

$$\Delta\theta_r^1 = \left[\frac{n_p(\lambda_A)}{n_p(\lambda_B)} - 1\right] \frac{n_G}{n_p}$$

$$\Delta\theta_r^2 = \left[\frac{n_p(\lambda_A)}{n_p(\lambda_B)} - 1\right] \frac{n_p}{n_G}$$

where
$\Delta\theta_r$ = angular spread of refraction
$n_p$ = index of prism (λ dependent)
$n_G$ = index of thin-film guide
$\lambda_A$ = shortest wavelength
$\lambda_B$ = longest wavelength Using lenses having a focal length of about 3 cm, a spatial displacement of the order of 450 μm is achieved for a wavelength spread of 60 nm (800 nm to 860 nm). This gives a spacial dispersion of about 7.5 μm/nm. which, for a detector array with 15 μm center-to-center spacing, permits resolution down to 2 nm. Thus with sources spaced at 2 nm intervals, 30 WDM channels can be demultiplexed in the range of 800 to 860 nm. With lenses having a diameter of 0.55 cm., the diffraction limited spot size is about 4 μm, following well within the available detector spacing of 15 μm. At the detector array 26, the $SiO_2$ isolation layer 10 is tapered down gradually to permit the light energy guided in the waveguide 14 to "tunnel" through the layer 10, into the detector 26.

What is claimed is:

1. An integrated optical wavelength demultiplexer comprising a substrate, a thin film waveguide deposited on the substrate, input means for introducing multichromatic light from an optical fiber into the waveguide, collimating means within the waveguide for collimating the light at a wavelength dispersive element in the form of a thin-film prism, and focussing means within the waveguide for focussing specific wavelength components of the light separated by the dispersive element onto specific ones of an array of photodetectors formed underneath the waveguide.

2. An integrated optical wavelength demultiplexer as claimed in claim 1 in which the thin film prism is composed of arsenic trisulphide having a refractive index of about 2.5.

3. An integrated optical wavelength demultiplexer as claimed in claim 1 in which at least one of said collimating means and said focussing means is a Luneburg lens.

4. An integrated optical wavelength demultiplexer as claimed in claim 3 in which the collimating means and the focussing means comprise Luneberg lenses composed of tantalum pentoxide.

5. An integrated optical wavelength demultiplexer as claimed in claim 1 in which said input means comprises a V-groove in the substrate to support an end portion of said fiber and a film of transparent material deposited in alignment with the V-groove and tapering towards said collimating means for directing light from a core of the fiber into the waveguide.

6. An integrated optical wavelength demultiplexer as claimed in claim 5 in which said transparent material is tantalum pentoxide.

7. An integrated optical wavelength demultiplexer as claimed in claim 1 in which the substrate is silicon having an upper oxidized layer over which oxidized layer said waveguide is deposited.

* * * * *